March 5, 1963  D. G. NEEDHAM ET AL  3,079,642
MOLDING OLEFIN POLYMER
Filed Aug. 25, 1960

INVENTORS
D. G. NEEDHAM
T. J. WINDLE
BY
ATTORNEYS

United States Patent Office 3,079,642
Patented Mar. 5, 1963

3,079,642
MOLDING OLEFIN POLYMER
Donald G. Needham and Tommy J. Windle, Bartlesville, Okla., assignors to Phillips Petroleum Company, a corporation of Delaware
Filed Aug. 25, 1960, Ser. No. 51,995
6 Claims. (Cl. 18—55)

This invention relates to a method of molding thick sections of olefin polymer without the formation of voids within the molded item.

Polymers of olefins such as polyethylene and polypropylene have a wide variety of uses and can be molded by a number of methods which include injection molding, extrusion, calendering and the like. None of these methods are very suitable however for fabricating the polymer into large sections, for example, large gears or wheels, where there is a considerable mass of polymer. The problem in connection with fabricating such items is that the polyolefin cools very slowly from a molten condition so that the polymer on the outside of the item will become solid while the polymer on the inside is still molten. When this occurs as the polymer cools further there is a strong tendency for voids to form within the polymer section. It is desirable to be able to mold large blocks of olefin polymer so that parts can be machined from these blocks. It can be seen, however, that such a practice will not permit voids anywhere within the block of polymer as this might weaken or deform the machined part.

As an additional problem to the molding of large sections of olefin polymer, as mentioned above, the polymer tends to cool quite slowly, thus a long molding cycle is frequently required. The successful commercialization of any molding process for the utilization of olefin polymer demands that a short cooling cycle be developed.

According to our invention a method of molding olefin polymers into large blocks without the formation of voids therein is provided while at the same time substantially shortening the total molding cycle. In other words, according to our invention large continuous and uniform sections of olefin polymers such as polyethylene can be formed in a relatively short time. The method of our invention comprises placing the molten olefin polymer in a block mold, applying pressure to the polymer while cooling the polymer partially until a hardened skin forms around the remaining still molten polymer, removing the polymer block thus partially cooled from the mold, applying pressure to said block with the mold removed, and continuing to cool the polymer while maintaining the block under pressure until the polymer completely solidifies.

It is an object of our invention to provide a method of making relatively thick sections of olefin polymer without the formation of voids within the section.

Another object of our invention is to provide a method of molding large sections of olefin polymer at a faster rate than ordinarily possible.

Still another object is to provide a method of molding olefin polymer into large uniform sections utilizing conventional equipment presently available to most fabricators.

Other objects, advantages and features of our invention will be apparent to those skilled in the art from the following discussion and drawing in which.

Figure 1:
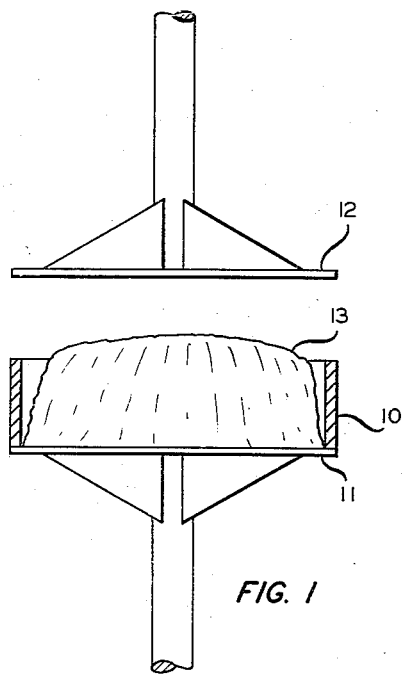
FIGURE 1 is a view partly in section of a picture frame mold containing molten polymer between the platens of a press.

The olefin polymers to which the method of our invention applies include polyethylene, polypropylene and polymers of higher mono-1-olefins containing up to 8 carbon atoms per molecule, for example, butene-1, 4-methylpentene-1, 4-ethylhexene-1, 1-octene and the like. Either the homopolymers of these monoolefins or the copolymers are suitable, especially the copolymers of ethylene with higher olefins such as ethylene/propylene copolymers and ethylene/butene-1 copolymers. In general these olefin polymers have a crystalline freezing point in the range of about 240 to 300° F. and are molded at temperatures in the range of about 280 to 450° F. The preferred molding temperatures for the practice of our invention with ethylene homopolymers or copolymers are in the range of about 300 to 325° F. The nature of these polymers is such that they are still solid when heated above their crystalline freezing point, sometimes referred to as melting point. The term "molten," therefore, when used in reference to these polymers means that the polymer is fluid and in a moldable condition. Temperatures substantially above the crystalline freezing point are generally necessary in order to provide a moldable polymer. As the polymer cools and solidifies it becomes rigid and resists deformation. Preferably in the practice of our invention the polymer is cooled to below its crystalline freezing point before the process is terminated. Crystalline freeze point determination is carried out by melting a sample of the polymer, inserting a thermocouple into the molten polymer and allowing the molten polymer to cool slowly. The temperature is recorded and is plotted in a chart versus time. The crystalline freeze point is the first plateau in the time-versus-temperature curve.

The apparatus which is used in our invention is conventional and available to most fabricators. We prefer to use what is called a picture frame mold which is a rectangular metal frame having an open top and bottom. This mold is used in co-operation with a press, preferably a vertical press having horizontal platens and capable of exerting several tons of force. A picture frame mold is chosen which is about the thickness of the slab of olefin polymer to be formed. This frame is placed on the lower horizontal platen of the press so that the upper and lower platens form the top and the bottom of the mold. It will be apparent to those skilled in the art that other types of molding equipment can be used, for example, any container, cylinder or the like having an open top can be used instead of the picture frame mold. Whatever specific apparatus is employed it is necessary that means be provided to exert pressure on the polymer itself as it is being cooled within the mold.

In the pratcice of our invention using a picture frame mold, the mold is first placed on the lower horizontal platen of the press and the mold is then filled with polymer in a molten condition. Such polymer will generally be taken from a Banbury mixer or from a mill or extruder. A slight excess of the polymer is used so that the mold will be completely filled when pressure is exerted on the polymer. The next step is to bring the platens of the press closer together so that the polymer is forced into the frame. Generally this pressure should be at least about 75 lbs./sq. in. and preferably considerably higher. For example, up to about 200 to 1,000 lbs./sq. in. is desirable. While maintaining this pressure on the polymer in the mold, the polymer is partially cooled until a hard crust or shell forms around the outside of the polymer block, with the inside of the block still molten. This cooling is preferably carried out by utilizing cooling coils within the platens. Such an arrangement is conventional and entirely suitable for practice of this initial cooling or skin hardening step of our invention. In general it can be said that this step should continue until a skin of at least about 0.01 inch thick forms completely around the molten polymer. Preferably this skin or crust has a thickness of at least about 0.03 to about 0.25 inch.

It will be readily recognized that the frame of the mold retards cooling of the polymer since the metal of the frame tends to hold heat and thereby lengthens the molding cycle. Since this occurs, the thickness of the polymer crust is generally greatest on the top or the bottom faces of the block which are in contact with the platens of the press. The sides of the polymer block which are in contact with the surfaces of the picture frame mold will tend to cool more slowly and the thickness of the crusts along the sides of the block should be at least the minimum dimension given above. In general the larger the block of polymer being molded the thicker the skin should be because higher pressures are necessary in the subsequent steps of the molding process and a thicker crust is required to prevent rupturing the block wall. The time of this initial cooling step can readily be determined by the fabricator to suit the specific conditions. It is desirable to remove the picture frame mold as soon as a substantial skin hardens around the block of polymer so that the total molding cycle can be reduced. In other words, the cooling can be considerably hastened after the picture frame mold has been removed and therefore it is desirable that the initial cooling step be as short as possible.

In the next step the pressure is released from the block of polymer and the picture frame mold is removed. The block is then placed on the platens of the press with the smallest dimension in the vertical direction. Sufficient pressure is placed on the block to prevent voids from forming within the block and the cooling is continued. In this manner the total cooling time can be reduced to about half of that required if the cooling is carried out entirely with polymer in the picture frame mold. For example, if two hours are required to cool the block of polymer with the block in the mold, only about one hour will be required to cool the block if the invention is practiced as herein described. It is important to recognize that the polymer block cannot be merely allowed to cool without further attention once the picture frame mold has been removed. If this is done, voids are certain to occur within the block as previously described.

A convenient method of determining whether or not sufficient pressure is being applied to the block during the last cooling step is to observe the sides of the block. When sufficient pressure is being applied the sides will bow outwardly to a degree which is quite visible. For example, a block which is about 1 inch thick can be molded according to our process by applying sufficient pressure to bow the sides of the block outwardly about ¼ inch. In other words, the center of the wall of the block extends outwardly about ¼ inch beyond the edges of the upper or lower faces of the block. As the thickness of the block increases, a greater amount of bow is required as an indication that sufficient pressure is being exerted on the block. As a general rule it can be said that the amount of bow should be at least about ⅛ inch and preferably about ¼ inch per inch of thickness of the block. Care must be exercised that too much pressure is not exerted as there is a danger of rupturing the thin skin of polymer which envelops the molten polymer at the center of the block. This danger is decreased as the polymer block continues to cool so that if desired higher pressures can be exerted toward the end of the cooling cycle. It is necessary, however, that the pressure be exerted continuously while polymer is being cooled. The block should be cooled until all of the polymer solidifies and preferably all of the polymer is cooled to below its crystalline freezing point. The length of this required cooling cycle can readily be determined and of course will vary with the size of the block being molded. After the removal of the picture frame mold it is convenient to use auxiliary means for cooling; for example, the sides of the polymer block can be contacted with a water spray or some similar cooling fluid which will hasten the cooling and thereby reduce the total molding cycle.

The pressure which is exerted on the polymer block as it is being cooled without the benefit of support from the picture frame mold will depend to a substantial degree upon the thickness of the skin which is formed in the initial cooling step. Too little pressure, of course, permits voids to form within the polymer but too much pressure will rupture the thin skin of the polymer wall and ruin the block. The maximum amount of pressure is readily determined and the minimum can be determined as stated above by observing the bow in the wall of the polymer block. Under average conditions the pressure on the face of the block adjacent the upper platen will be in the range of about 70 to 125 lbs/sq. in. per inch of thickness of the polymer block. For example, with a slab of polymer 2 inches thick the pressure on the face of the polymer should be about 140 to 250 lbs./sq. in. Another way of stating this is that it is desirable to apply to the upper face of the block a force equivalent to about 70 to 125 lbs./cu. in. of polymer in the slab.

Figure 3:
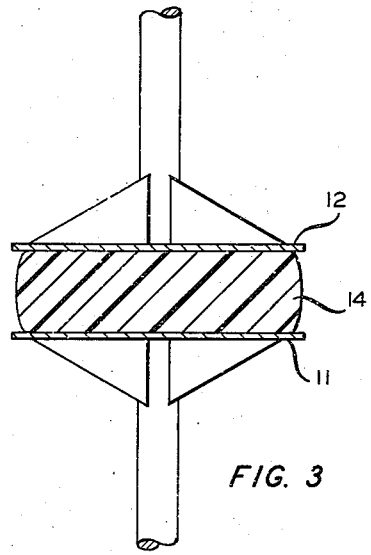
FIGURE 3 is a view of the partially cooled polymer block under pressure with the mold removed.
Figure 2:
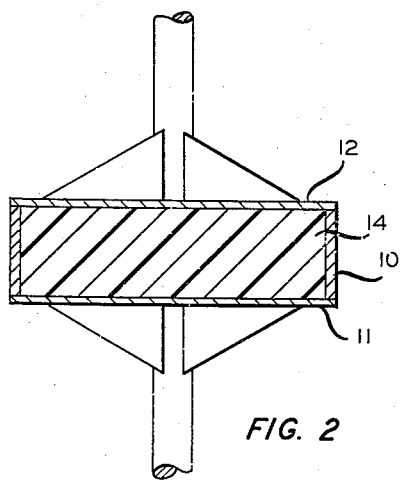
FIGURE 2 is a view of the press forcing the polymer to fill the mold.
Figure 4:
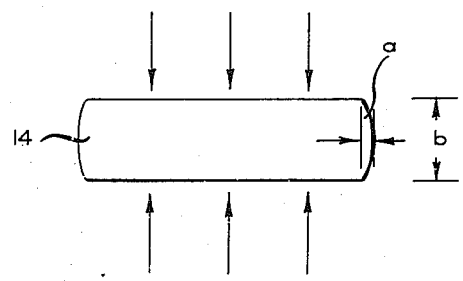
FIGURE 4 is a diagram of the bow introduced in the wall of the block.

The invention can be more fully understood by referring to the drawings. In FIGURE 1 a picture frame mold 10 partly in section is shown in position on the lower platen 11 of a hydraulic press. The upper platen 12 of the press is raised and the picture frame mold is filled with molten polymer 13. In FIGURE 2 the press is shown with platens 11 and 12 brought together to compress the polymer in the picture frame mold and completely fill the mold to form a block 14. After the polymer has skin hardened the mold is removed and the polymer block is again compressed between the platens as shown in FIGURE 3. The force of the press is transmitted to the interior and still molten polymer of the block as evidenced by the bow in the walls of block 14. The polymer block is allowed to harden throughout while under pressure in the position of FIGURE 3. FIGURE 4 illustrates the amount of bow desired in the walls of the block to insure that there will be no voids therein after cooling. The outward bow is shown as dimension (a) and the thickness is shown as dimension (b). As explained previously the amount of bow, dimension (a), should be about ⅛ inch or more for every inch of thickness of the block, dimension (b).

After the polymer slab has cooled it is removed from the press and, if desired, the deformed sides of the block, which will of course retain the bow imparted to the block during the final cooling step, can be trimmed from the slab. In this way one can obtain square stock that can be readily stored or packaged. The advantages of our invention are further illustrated by the following examples. In these examples the specific conditions given are presented as being typical only and they should not be construed to limit the invention unduly.

*Example I*

A block of polyethylene having the dimensions of 6 x 6 x 6 inches is formed by filling a picture frame mold having a cavity of this dimension with molten polyethylene at a temperature of about 300° F. The polyethylene has a crystalline freezing point of 252° F. The mold is placed between the platens of a hydraulic press which is capable of exerting a force in excess of 25 tons. The platens of the press are equipped with ⅜" cooling coils through which water at 60° F. can be circulated. After the molten polymer is in the picture frame mold, the platens of the press are brought together until a force of 25 tons is exerted on the polymer and the mold. Cooling water is circulated through the coils in the platens, after 10 minutes a hardened skin of polymer forms about the block. The picture frame mold is then removed and the block is returned to between the platens of the press. A force of 10 tons is exerted upon the block and the cooling is continued until the polymer in the block is completely solid. Time required for cooling after the frame has been removed is one hour and 30 minutes. Substantially longer is required if the block is cooled without removing the frame. The finished block is void-free and the walls of the block are slightly bowed outwardly.

*Example II*

Molten polyethylene at 300° F. is placed within the cavity of a picture frame mold having dimensions of 6 x 6 x 2½ inches thick under a force of 20 tons. The polymer block is cooled for 10 minutes which is sufficient to skin harden the polymer. The frame is then removed and cooling is continued for one and one-half hours while exerting a force of 5 tons upon the block during the cooling. The vertical wall of the polymer block bows outwardly about ⅜ of an inch. Pressure exerted is equal to about 110 lbs./cu. in. polymer in the block. The block is void-free.

*Example III*

A block of the same dimensions as in Example II is formed using molten polymer initially at a temperature of 300° F. and cooling under a force of 20 tons for 7 minutes. The frame is then removed from the block and the pressure of 4 tons or 88 lbs./cu. in. of polymer is applied to the block without the frame. Cooling is continued for one hour. A solid void-free block is formed.

*Example IV*

Using a picture frame mold having a cavity of 10 x 10 x 1½ inches, molten polyethylene at 300° F. is poured into the mold and a force of 20 tons is exerted on the polymer. The polymer block is cooled for 10 minutes and the frame is removed. A force of 7.5 tons is applied against the polymer block after the frame has been removed, this force being equal to 100 lbs./cu. in. of polymer. The block is cooled for 45 minutes and a void-free block of polymer results.

As will be apparent to those skilled in the art from the above discussion various embodiments and modifications of our invention can be made without departing from the spirit or scope thereof.

We claim:

1. A method of molding a block of olefin polymer without the formation of voids therein which comprises placing molten olefin polymer in a block mold, applying pressure to said polymer while cooling until a hardened skin of polymer forms around the remaining still molten polymer, removing the polymer block thus partially cooled from the mold, applying pressure to said block, on two faces without confining the remainder of said block and continuing to cool said polymer while maintaining the block under pressure until said polymer completely solidifies.

2. A method of molding a block of olefin polymer without the formation of voids therein which comprises placing molten olefin polymer within a picture frame mold disposed between two platens of a vertical press, applying pressure to said polymer in said mold by bringing said platens closer together, cooling said polymer while continuing to apply pressure until a hardened outer skin forms around the remaining still molten polymer, removing the polymer block from said mold while the center of said block is still molten, applying pressure with said press to said block without said mold, thereby causing the sides of said block to bow visibly, and cooling said block while continuing to apply pressure until the polymer solidifies throughout.

3. The method of claim 2 wherein the pressure applied to the partially cooled block of polymer after the mold has been removed is sufficient to cause the walls of the block to bow outwardly at least about ⅛ inch per inch thickness of said block.

4. A method of molding a block of olefin polymer at least 1 inch thick without forming voids within said block which comprises placing molten olefin polymer in a picture frame mold of the desired thickness, said mold being disposed between the horizontal platens of a vertical press, applying pressure to said polymer in said mold with said platens, cooling said polymer under pressure until a solidified skin of polymer at least 0.01 inch thick forms surrounding the remaining still molten polymer, removing said polymer thus partially hardened in the shape of a block from said mold, applying pressure on said block between said platens without said mold, said pressure being about 70 to 125 pounds per square inch of maximum cross section per inch of thickness of said block, and cooling said block while under said pressure until the polymer is completely solid.

5. The method of claim 4 wherein said olefin polymer is polyethylene.

6. A method of molding a block of polymer of mono-1-olefin having from 1 to 8 carbon atoms per molecule without forming voids within said block, said block being at least 1 inch thick, which comprises filling a picture frame mold disposed between two horizontal platens of a vertical press with said polymer in a molten state, applying a pressure of at least about 50 pounds per square inch against the upper face of the polymer in said mold by bringing said platens closer together, cooling said polymer under pressure by circulating cooling fluid through channels in said platens until a solidified skin of polymer about 0.03 to 0.25 inch thick forms surrounding the remaining still molten polymer, removing the thus partially hardened polymer block from said mold, placing said partially hardened block between said platens with the minimum dimension in the vertical direction, applying a force to said partially hardened block with said platens against the upper and lower faces of said block, said force being equivalent to about 70 to 125 pounds per cubic inch of polymer in said block and sufficient to cause the vertical faces of said block to bow slightly outward, cooling said polymer until completely solid while continuing to apply said force in the absence of said mold, removing said block from between said platens, and trimming the vertical faces from said block.

References Cited in the file of this patent

UNITED STATES PATENTS

| | | |
|---|---|---|
| 2,232,475 | Renfrew et al. | Feb. 18, 1941 |
| 2,333,051 | Smith | Oct. 26, 1943 |
| 2,945,264 | Riccitiello et al. | July 19, 1960 |